United States Patent [19]

Shibahashi et al.

[11] Patent Number: 5,688,592
[45] Date of Patent: Nov. 18, 1997

[54] THERMOCHROMIC LAMINATE COMPRISING LIGHT INTERCEPTING PIGMENT AND LIGHT STABILIZER

[75] Inventors: Yutaka Shibahashi, Nagoya; Katsuyuki Fujita, Bisai, both of Japan

[73] Assignee: The Pilot Ink Co., Ltd., Nagoya, Japan

[21] Appl. No.: 425,788

[22] Filed: Apr. 20, 1995

[30] Foreign Application Priority Data

Apr. 22, 1994 [JP] Japan ................. 6-107776

[51] Int. Cl.$^6$ ......................... B32B 5/16
[52] U.S. Cl. ............. 428/323; 428/324; 428/328; 428/403; 428/913; 428/914; 503/200; 503/207; 503/215; 503/216; 503/225
[58] Field of Search ............... 428/323, 324, 428/328, 403, 402.24, 913, 914; 503/200, 201, 207, 216, 215, 225

[56] References Cited

U.S. PATENT DOCUMENTS 5,352,649  10/1994  Shibahashi et al. ............ 503/207

FOREIGN PATENT DOCUMENTS

| 0358949 | 3/1990 | European Pat. Off. . |
| 0523888 | 1/1993 | European Pat. Off. . |
| 0526019 | 2/1993 | European Pat. Off. . |
| WO 90 02054 | 3/1990 | WIPO . |

OTHER PUBLICATIONS

Derwent Publication (8728) AN 87-194521 (JP-A-62 122 750 Jun. 1987).
Derwent Publication (8815) AN 88-103150 (JP-A-63 054 484 Mar. 1988).
Derwent Publication (9309) AN 93-070645 (JP-A-05 016 302 Jan. 1993).
Derwent Publication (9338) AN 93-300403 (KR-B-9 210 717 Dec. 1992).
Derwent Publication (9424) AN 94-196675 (JP-A-06 134 915 May 1994).

*Primary Examiner*—H. Thi Le
*Attorney, Agent, or Firm*—Fitzpatrick, Cella, Harper & Scinto

[57] ABSTRACT

A thermochromic laminate is provided which comprises a thermochromic layer, and a coating layer or layers laminated thereon containing a light-intercepting pigment and a light stabilizer; the coating layer or layers containing the light-intercepting pigment and the light stabilizer dispersed and fixed in a first film-forming material, and the thermochromic layer constituted of a homogeneous solid composed of an electron-donating coloring organic compound, an electron-accepting compound, and an organic compound medium for adjusting color reaction temperature dispersed and fixed in a second film forming material; the light-intercepting pigment being one or more pigments selected from metallic luster pigments, transparent titanium dioxide, transparent iron oxide, transparent cesium oxide, and transparent zinc oxide; and the light stabilizer being one or more chemicals selected from ultraviolet absorbers, antioxidants, singlet oxygen quenchers, superoxide anion quenchers, ozone quenchers, visible light absorbers, and infrared absorbers. The thermochromic laminate has remarkably improved light-fastness.

9 Claims, 1 Drawing Sheet

THERMOCHROMIC LAMINATE COMPRISING LIGHT INTERCEPTING PIGMENT AND LIGHT STABILIZER

BACKGROUND OF THE INVENTION

1. Field of the Invention

The present invention relates to a thermochromic laminate. More specifically, the present invention relates to a thermochromic laminate having remarkably improved light-fastness.

2. Related Background Art

Many attempts have been made to improve the light-fastness of thermochromic materials, and the results thereof have been disclosed. For example, JP-B-4-18543 discloses the lamination of a synthetic resin layer containing an ultraviolet absorber, an antioxidant, and the like on the thermochromic layer. ("JP-B" herein means an "examined Japanese patent. publication".) In another attempt, a light reflection layer or a light absorption layer is provided on a thermochromic layer to reflect or absorb ultraviolet light or visible light to protect the underlying thermochromic layer from the light. In still another attempt, a color filter is employed.

The above attempts have disadvantages which are described below. When the thermochromic material contains an electron-donating coloring organic compound and an electron-accepting compound, deterioration due to light of the electron-donating coloring organic material cannot be completely prevented by the use of a UV-intercepting means such as a UV absorber. The light reflection layer, which gives satisfactory effect, makes the thermochromic layer whitish owing to the reflectivity of the reflection layer, and thus prevents visual observation of color change of the underlying thermochromic layer. The light absorption layer, which is inevitably dark colored or blackish, also prevents visual observation of the color change of the underlying thermochromic layer. With the color filter, for example, the one having a yellow-colored layer, a blue-colored thermochromic layer is observed to be green owing to the yellow layer since the electron-donating coloring organic compound absorbs yellow light and reflects the blue light; when the thermochromic layer turns colorless, only the yellow light reflected by the yellow color layer is observed since the electron-donating coloring organic compound reflects all visible light. Thus, it is seen that the observed color changes reversibly between green and yellow. However, use of a color filter allows for the visualation of the reversible change between two colored states, but does not allow for the visualization of the reversible color change between a colored state and a colorless state.

SUMMARY OF THE INVENTION

The present invention provides a thermochromic laminate having significantly improved light-fastness and allows for the clear visualization of color change of a thermochromic layer, and further clear visualization of the change of a metallic luster color, such as gold, silver, and a metallic color in a system employing a metal-luster pigment.

The thermochromic laminate of the present invention comprises a thermochromic layer, and a coating layer or layers laminated thereon containing a light-intercepting pigment and a light stabilizer; the coating layer or layers containing the light-intercepting pigment and the light stabilizer dispersed and fixed in a first film-forming material, and the thermochromic layer constituted of a homogeneous solid composed of an electron-donating coloring organic compound, an electron-accepting compound, and an organic compound medium for adjusting color reaction temperature dispersed and fixed in a second film forming material; and the light-intercepting pigment being one or more pigments selected from metallic luster pigments, transparent titanium dioxide, transparent iron oxide, transparent cerium oxide, and transparent zinc oxide, the light stabilizer being one or more chemicals selected from ultraviolet absorbers, antioxidants, singlet oxygen quenchers, superoxide anion quenchers, ozone quenchers, visible light absorbers, and infrared absorbers.

DETAILED DESCRIPTION OF THE PREFERRED EMBODIMENTS

The present invention is described by reference to drawings (FIG. 1 to FIG. 7).

The thermochromic laminate 1 of the present invention comprises a thermochromic layer, and a coating layer or layers laminated thereon containing a light-intercepting pigment and a light stabilizer. The light-intercepting pigment is one or more pigments selected from metallic luster pigments, transparent titanium dioxide, transparent iron oxide, transparent cerium oxide, and transparent zinc oxide. The light stabilizer is one or more chemicals selected from ultraviolet absorbers, antioxidants, singlet oxygen quenchers, superoxide anion quenchers, ozone quenchers, visible light absorbers, and infrared absorbers. The coating layer is constituted of the light-intercepting pigment and the light stabilizer dispersed and fixed in a first film forming material, and the thermochromic layer 2 is constituted of a homogeneous solid composed of an electron-donating coloring organic compound, an electron-accepting compound, and an organic compound medium for adjusting the color reaction temperature dispersed in a second film forming material.

The coating layer may be constituted of two layers of a light-intercepting pigment layer 3 and a light stabilizer layer 4, the light-intercepting pigment layer containing a light-intercepting pigment dispersed and fixed in a film-forming material, and the light stabilizer layer containing a light stabilizer dispersed and fixed in a film-forming material. The light stabilizer layer 4 may be laminated on or underneath the light-intercepting layer 3. (Coating layer type (1) shown in FIGS. 1 and 2.)

Figure 1:
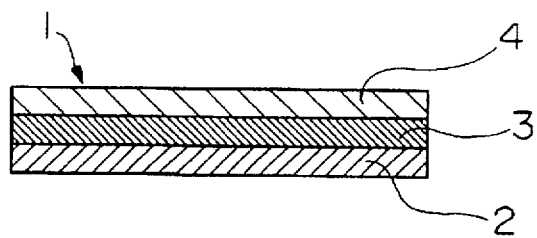
FIG. 1 is a cross-sectional view of an example of a thermochromic laminate of the present invention.
Figure 2:
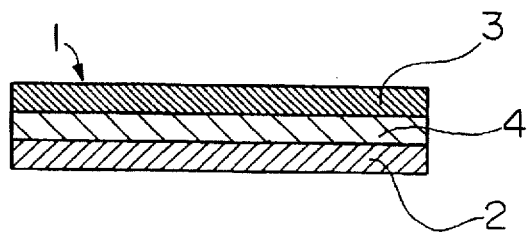
FIG. 2 is a cross-sectional view of another example of a thermochromic laminate of the present invention.
Figure 3:
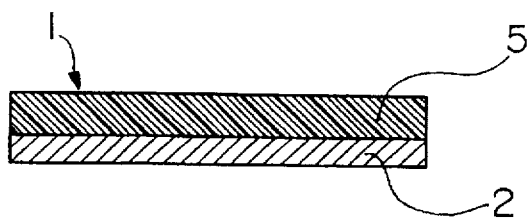
FIG. 3 is a cross-sectional view of still another example of a thermochromic laminate of the present invention.

The coating layer may be a single combined layer 5 containing both the light-intercepting pigment and a light stabilizer dispersed in a film-forming material (Coating layer type (2), shown in FIG. 3.)

Figure 4:
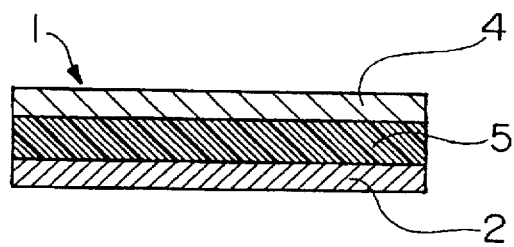
FIG. 4 is a cross-sectional view of a further example of a thermochromic laminate of the present invention.
Figure 5:
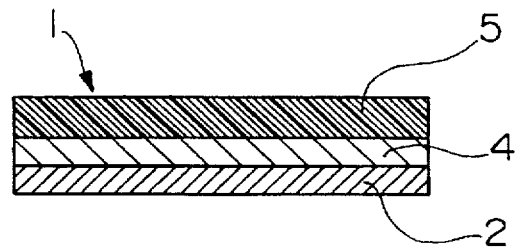
FIG. 5 is a cross-sectional view of a still further example of a thermochromic laminate of the present invention.
Figure 6:
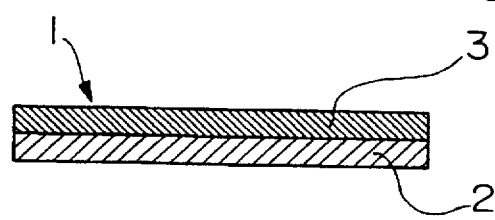
FIG. 6 is a cross-sectional view of a thermochromic laminate of a comparative example.
Figure 7:
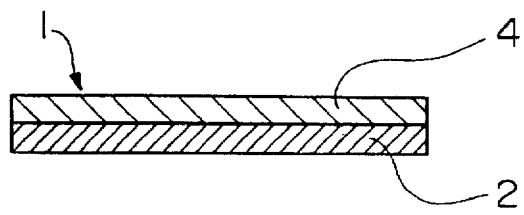
FIG. 7 is a cross-sectional view of a thermochromic laminate of another comparative example.

The coating layer may be have a light stabilizer layer 4 laminated on the above combined layer 5 (Coating layer type (2-1) as shown in FIG. 4) or underneath the combined layer 5 (Coating layer type (2-2) as shown in FIG. 5).

Preferably, the light-intercepting pigment is a metallic luster pigment composed of particulate natural mica coated with titanium oxide in a particle size of from 5 to 100 μm, and the light stabilizer is selected from ultraviolet absorbers.

Specific examples of the metallic luster pigment include a gold metallic luster pigment composed of natural mica coated with 41 to 44% by weight of titanium oxide and having a particle size of 5 to 60 μm; a gold metallic luster pigment composed of natural mica coated with 30 to 38% by weight titanium oxide and further coated thereon with 0.5 to 10% by weight of non-thermochromic colored pigment and having a particle size of 5 to 60 μm; a silver metallic luster pigment composed of natural mica coated with 16 to 39% by weight of titanium oxide and having a particle size of 5 to 100 μm; a metallic color luster pigment composed of natural mica coated with 45 to 58% by weight of titanium oxide; a metallic color luster pigment composed of natural mica coated with 45 to 58% by weight of titanium oxide, and further coated thereon with 4 to 10% by weight of iron oxide; and a metallic color luster pigment composed of natural mica coated with 45 to 58% by weight titanium oxide and further coated thereon with 0.5 to 10% by weight of a non-thermochromic colored dye or pigment.

The light stabilizers useful in the present invention are shown below specifically.

The ultraviolet absorber includes:

benzophenone type ultraviolet absorbers such as 2,4-dihydroxybenzophenone, 2-hydroxy-4-methoxybenzophenone, 2,2'-dihydroxy-4,4'-dimethoxybenzophenone, 2,2',4,4'-tetrahydrobenzophenone, 2-hydroxy-4,4-methoxybenzophenone-5-sulfonic acid, 2-hydroxy-4-octyloxybenzophenone, bis(2-methoxy-4-hydroxy-5-benzoylphenyl)methane, 2-(2'-hydroxy-3',5'-di-t-amylphenyl)benzophenone, 2-hydroxy-4-dodecyloxybenzophenone (trade name: Seesorb 103, produced by Shipro Kasei K. K.), 2-hydroxy-4-octadecyloxybenzophenone, 2,2"-dihydroxy-4-methoxybenzophenone, 2-hydroxy-4-benzyloxybenzophenone, and 2-(2'-hydroxy-3',5'-di-t-amylphenyl)benzophenone;

salicyl acid type ultraviolet absorbers such as phenyl salicylate, p-t-butylphenyl salicylate, p-octylphenyl salicylate, 2,4-di-t-butylphenyl-3,5-di-t-butyl-4-hydroxybenzoate, phenyl salicylate, 4-t-butylphenyl salicylate 4-octylphenyl salicylate, and resorcinol monobenzoate;

cyanoacrylate type ultraviolet absorbers such as (ethyl)-(2-cyano-3,3'-diphenyl acrylate), 2-ethylhexyl-2-cyano-3,3'-diphenyl acrylate, 2-ethylhexyl-2-cyano-3-phenyl cinnate;

benzotriazole type ultraviolet absorbers such as 2-(5-t-butyl-2-hydroxyphenyl)benzotriazole (trade name: Tinuvin-PS, produced by Ciba Geigy Co.), 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-butyl-2-amyl-2-hydroxyphenyl)benzotriazole (trade name: Tinuvin 328, produced by Ciba Geigy Co.), condensate of methyl-3-[3-t-butyl-5-(2H-benzotriazole-2-yl)-4-hydroxyphenyl) propionate-polyethylene glycol (molecular weight: 300) (trade name: Tinuvin 213, produced by Ciba Geigy Co.), 2-(3-dodecyl-5-methyl-2-hydroxyphenyl)benzotriazole, condensate of methyl-3-[3-(2H-benzotriazol-2-yl)-5-t-butyl-4-hydroxyphenyl) propionate-polyethylene glycol (molecular weight: 300), (trade name: Tinuvin 213, produced by Ciba Geigy Co.) 2-(3-t-butyl-5-propyloxycarbonylethyl-2-hydroxyphenyl)-5-chlorobenzotriazole, 2-(2-hydroxy-5-t-octylphenyl)-2H-benzotriazole, 2-(3-t-butyl-5-octyloxycarbonylethyl-2-hydroxyphenyl)benzotriazole (trade name: Tinuvin 384, produced by Ciba Geigy Co.), 2-(2-hydroxy-5'-methylphenyl)benzotriazole, 2-(2-hydroxy-4-octyloxyphenyl)benzotriazole, 2-[2'-hydroxy-3'-(3",4", 5",6"-tetrahydrophthalimidomethyl)-5'-methylphenyl] benzotriazole, and 2-(2-hydroxy-5-t-butylphenyl) benzotriazole;

oxanilide type ultraviolet absorbers such as ethanediamido-N-(2-ethoxyphenyl)-N'-(4-isododecylphenyl), and 2,2,4,4-tetramethyl-20-(β-lauryloxycarbonyl)ethyl-7-oxa-3,20-diazodispiro[5.1.11.2]heneicosanoic acid-21-one.

The antioxidant includes: hindered amine type antioxidants such as dimethyl succinate[1-(2-hydroxyethyl)-4-hydroxy-2,2,6,6-tetramethylpiperidine]polycondensate (trade name: Tinuvin 622LD, produced by Ciba Geigy Co.), poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}], 2-(3,5-di-t-butyl-4-hydroxybenzyl)-2-n-butyl-malonate-bis(1,2,2,6,6-pentamethyl-piperidyl), N,N'-bis(3-aminopropyl)ethylenediamine-2,4-bis[N, butyl-N-(1,2,2,6,6-pentamethyl-4-piperidyl)amino]-6-chloro-1,3,5-triazine condensate (trade name: Chimassorb 119FL, produced by Ciba Geigy Co.), bis(1,2,2,6,6-pentamethyl-4-piperidyl) sebacate, 4-benzoyloxy-2,2,6,6-tetramethylpiperidine, and bis(2,2,6,6-tetramethyl-4-piperidyl) sebacate;

phenol type antioxidants such as 2,6-di-t-butyl-4-methylphenol, 2,6-di-t-4-methoxyphenol, 2,6-di-t-butyl-4-ethylphenol, octadecyl 3-(3,5-di-t-butyl-4-hydroxyphenyl)propionate, 2,2-methylenebis(4-methyl-6-t-butylphenol), 4,4-thiobis(2-methyl-6-t-butylphenol), 2,2-thiobis(4-methyl-6-t-butylphenol), 4,4-butylidenebis(3-methyl-6-t-butylphenol), 3,9-bis[1,1-dimethyl-2-[β-(3-t-butyl-4-hydroxy-5-methylphenyl)propionyloxy]ethyl]-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydrdoxybenzyl) benzene, tetrakis[methylene-3-(3,5-di-t-butyl-4-hydroxyphenyl)propionate]methane (trade name: Sumilizer BP-101, produced by Sumitomo Chemical Co.), 2,2-ethylenebis(4,6-di-t-butylphenol), 1,3,5-tris(3', 5'-di-t-butyl-4'-hydroxybenzyl)-s-triazine-2,4,6-(1H,3H, 5H)-trione, tocopherol, 1,3,5-tris(4-t-butyl-3-hydroxy-,2, 6-dimethylbenzyl) isocyanurate, pentaerythritol tetrakis (3-laurylthiopropionate), triethylene glycol bis[3-(3-t-butyl-5-methyl-4-hydroxyphenyl)propionate] (trade name: Irganox 245, produced by Ciba Geigy Co.), 1,6-hexanediol bis[3,5-di-t-butyl-4-hydroxyphenyl) propionate], 2,2-thioethylene-bis[3-(3,5-di-t-butyl-4-hydroxyphenyl)propionate], N,N'-hexamethylene-bis(3, 5-di-t-butyl-4-hydroxyhydrocinnamide) (trade name: Irganox 1098, produced by Ciba Geigy Co.), tris(3,5-di-t-butyl-4-hydroxybenzyl)isocyanurate (trade name: Irganox 3114, produced by Ciba Geigy Co.), polymerized-2, 2,4-trimethyl-1,2-hydroquinone, styrenatedphenol, 2,5-di-t-butylhydroquinone, and bis(2,2,6,6-tetramethyl-4-piperidyl) sebacate; 2,4-bis(n-octylthio)-6-(4-hydroxy-3, 5-di-t-butylanilino)-1,3,5-triazine, and octylated diphenylamine, sulfur type antioxidants such as dilauryl 3,3'-thiodipropionate, dimyristyl 3,3'-thiodipropionate, distearyl 3,3'-thioodipropionate, and stearylthiopropylamide;

phosphite type antioxidants such as tris(2,4-di-t-butylphenyl) phosphite, bis(2,4-di-t-butylphenyl) pentaerythritol diphosphite, 3,5-di-t-butyl-4-hydroxybenzyl phosphanate diethyl ester, triphenyl phosphite, diphenyl isodecyl phosphite, phenyl isodecyl phosphite, 4,4'-butylidenebis(3-methyl-6-t-butylphenylditridecyl) phosphite, octadecyl phosphite, tris(nonylphenyl) phosphite, diisodecyl pentaerythritol diphosphite, 9,10-dihydro-9-oxa-10-phosphaphenanthrene, 10-(3,5-di-t-butyl-4-hydroxybenzyl)-9,10-dihydro-9-oxa-10-phosphaphenanthrene 10-oxide, 10-decyloxy-9,10-dihydro-9-oxa-10-phosphaphenanthrene, cyclic neopentan-tetra bis(2,4-di-t-butylphenyl) phosphite, cyclic neopentan-tetrayl-bis(2,6-di-t-butyl-4-methylphenyl) phosphite, and 2,2-methylenebis(4,6-di-t-butylphenyl)octyl phosphite.

The singlet oxygen quencher includes carotenes, dyes, amines, phenols, nickel complexes, sulfides, and the like, specifically exemplified by 1,4-diazabicyclo[2.2.2]octane (DABCO), β-carotene,
1,3-cyclohexadiene, 2-diethylaminomethylfuran,
2-phenylaminomethylfuran,
9-diethylaminomethylanthracene,
5-diethylaminomethyl-6-phenyl-3,4-dihydroxypyrane,
nickel dimethyldithiocarbamate,
nickel 3,5-di-t-butyl-4-hydroxybenzyl-O-ethyl phosphonate,
nickel 3,5-di-t-butyl-4-hydroxybenzyl-O-butyl phosphonate,
nickel [2,2'-thiobis(4-t-octylphenolate)](n-butylamine),
nickel [2,2'-thiobis(4-t-octylphenolate)](2-ethyhexylamine),
nickel bis[2,2'-thiobis(4-t-octylphenolate)],
nickel bis[2,2'-sulfone-bis(4-t-octylphenolate)],
nickel bis[2-hydroxy-5-methoxyphenyl-N-n-butylaldimine),
nickel bis(dithiobenzyl), and
nickel bis(dithioacetyl).

The superoxide anion quencher includes superoxide dismutase complex with nickel or cobalt, and the like.

The ozone quencher includes
4,4'-thiobis(6-t-butyl-m-cresol),
2,4,6-tri-t-butylphenol,
1,4-diazabicyclo[2.2.2]octane,
N-phenyl-β-naphthylamine,
α-tocopherol,
4,4'-methylenebis(2,6-di-t-butylphenol),
p,p'-diaminodiphenylmethane,
2,2'-methylenebis(6-t-butyl-p-cresol),
N,N'-diphenyl-p-phenylenediamine,
N,N'-diphenylethylenediamine,
N-isopropyl-N'-phenyl-p-phenylenediamine, and the like.

The visible light absorber includes dyes, pigments, and other colored substances. The dyes are exemplified by C.I. Solvent Yellow 19, 21, and 61; C.I. Solvent Orange 5, and 6; C.I. Solvent Red 8, and 24; C.I. Solvent Violet 14, and 21; C.I. Solvent Blue 11, and 25; C.I. Solvent Black 5, and 125; and the like. The pigments are exemplified by those of Color Index numbers of 10825, 11680, 11725, 11780, 12060, 12120, 12490, 12500, 12710, 21090, 21110, 21165, 21180, 21205, 45170, 50440, 58055, 69800, 69810, 70600, 74160, 74265, 127755, etc.

The infrared absorber is a compound which has absorption maximum at the near-infrared region of from 700 to 2000 nm and does not exhibit large absorption in visible region of from 400 to 700 nm, and exemplified by the compounds represented by the chemical formulas below:

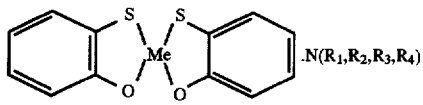

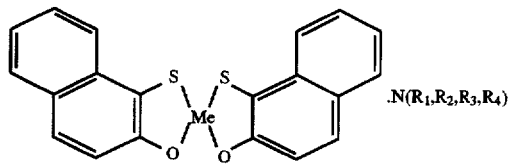

where $R_1$, $R_2$, $R_3$, and $R_4$ are an alkyl group independently; X is a halogen atom or a hydrogen atom; and Me is nickel, palladium, or platinum.

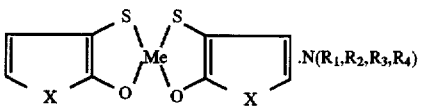

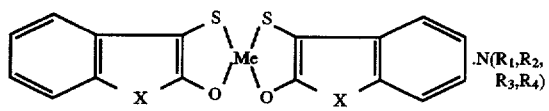

where $R_1$, $R_2$, $R_3$, and $R_4$ are an alkyl group independently; Me is nickel, palladium, or platinum; and X is a carbon atom, an oxygen atom, or a sulfur atom,

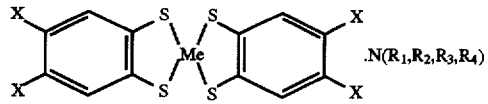

where $R_1$, $R_2$, $R_3$, and $R_4$ are an alkyl group independently; X is a halogen atom or a hydrogen atom; and Me is nickel, palladium, or platinum,

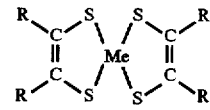

where, R is a hydrogen atom, an alkyl group, a phenyl group, an alkyl- or alkoxy-substituted phenyl group, or a thienyl group; and Me is nickel, palladium, or platinum,

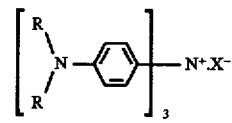

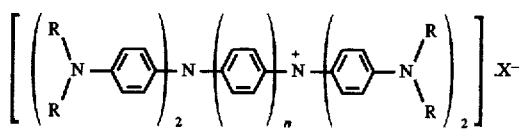

-continued

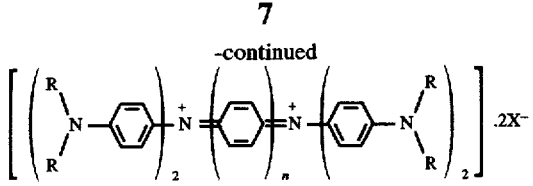

where R is an alkyl group, and X is an anion group selected from perchlorate ($ClO_4^-$), fluoroborate ($BF_4^-$), trichloroacetate ($CCl_3COO^-$), trifluoroacetate ($CF_3COO^-$), picrate [$(NO_3)_3C_6H_2O^-$], hexafluoroarsenate ($AsF_6^-$), hexachloroantimonate ($SbCl_6^-$), hexafluoroantimonate ($SbF_6^-$), benzenesulfonate ($C_6H_5SO_3^-$), alkylsulfonate ($RSO_3^-$), phosphate ($PO_4^{3-}$), sulfate ($SO_4^{2-}$), chloride ($Cl^-$), and bromide ($Br^-$); and the like substances.

The thermochromic layer is constituted of a thermochromic material containing an electron-donating coloring organic compound, an electron-accepting compound, and an organic compound medium (color change temperature controlling agent) for controlling the temperature of color reaction between the above two compounds. Such thermochromic materials are disclosed, for example, in JP-B-51-35414, JP-B-51-44706, JP-B-1-17154.

The thermochromic materials include:
(1) Reversible thermochromic materials containing essentially three components of (a) an electron-donating coloring organic compound, (b) a compound having a phenolic hydroxyl group, and (c) a higher aliphatic monohydric alcohol having no polar substituent;
(2) Reversible thermochromic materials containing essentially three components of (a) an electron-donating coloring organic compound, (b) a compound having a phenolic hydroxyl group, and (c) an ester derived from an aliphatic monohydric alcohol having no polar substituent and an aliphatic monocarboxylic acid having no polar substituent;
(3) Reversible thermochromic materials containing essentially three components of (a) an electron-donating coloring organic compound, (b) a compound having a phenolic hydroxyl group, and (c) a compound selected from higher aliphatic monohydric alcohols having no polar substituent and esters derived from an acyclic aliphatic monohydric alcohol having no polar substituent and an aliphatic monocarboxylic acid having no polar substituent, the three components being enclosed in microcapsules; and
(4) Reversible thermochromic materials containing essentially three components of (a) an electron-donating coloring organic compound, (b) a compound having a phenolic hydroxyl group, and (c) a compound selected from higher aliphatic monohydric alcohols having no polar substituent and esters derived from an acyclic aliphatic monohydric alcohol having no polar substituent and an aliphatic monocarboxylic acid having no polar substituent, the three components being dissolved or dispersed in a vehicle.

The thermochromic materials also include the one disclosed by the inventors of the present invention in JP-B-4-17154, containing a thermochromic color memory dye which changes color with high hysteresis characteristics. That is, this material exhibits very different color-temperature dependence for the temperature rise from that for the temperature drop through the color-changing temperature range, and memorizes the changed color state at a temperature between the upper color change temperature and the lower color change temperature.

While the above-described thermochromic materials are typically applied in an enclosed state in microcapsules, they are also effective in a free state.

The thermochromic material may be used in a form of a thermochromic coating layer formed by coating of a coloring material composed of the material dispersed in a binder-containing solvent; in a form of a sheet-shaped thermochromic layer formed by application on a release paper sheet and separation from it; or in a form of a thermochromic film or sheet formed from melt-blend of a microcapsule containing the thermochromic material with a thermoplastic resin.

The thermochromic layer is not limited to a sheet form, but may also be a thermochromic article in any desired shape comprising the thermochromic material enclosed in microcapsules dispersed in a thermoplastic resin or a thermosetting resin.

The thermochromic material is contained in a film-forming material, or a thermoplastic or thermosetting resin at a content of from 0.5 to 40% by weight, preferably from 1 to 30% by weight. At a content of lower than 0.5 % by weight, sharp color change is not observed, while, at a content of higher than 40% by weight, the thermochromic material is present in an excessive amount so as to cause residual color in a decolored state.

The light-intercepting pigment layer 3 may be formed by dispersing a light-intercepting material in a solvent containing a film-forming binder and applying it, or may be formed in a film or a sheet shape from a blend of the light-intercepting material in a thermoplastic resin.

The light-intercepting pigment has a particle diameter of from about 5 to about 100 µm and is dispersed uniformly in a film-forming material at a content of from 0.1 to 40% by weight, preferably from 5 to 30% by weight to achieve a desired light interception effect.

The light stabilizer layer 4 contains one or more of the aforementioned light stabilizers at a content of from 1 to 40% by weight, preferably from 5 to 30% by weight, and is formed into a coating layer, a film, or a sheet.

The combined layer 5 contains both a light-intercepting pigment layer and a light stabilizer dispersed and fixed in one and the same layer, containing the light-intercepting pigment at a content % of from 0.1 to 40% by weight, preferably from 5 to 30 by weight, and the light stabilizer at a content of from 1 to 40% by weight, preferably from 5 to 30% by weight, in the total amount thereof of from 1.5 to 60 % by weight, preferably from 5 to 40% by weight. The combined layer may be formed by coating, or by molding in a shape of a film or a sheet as the aforementioned layers.

The laminate 1 may be formed, specifically, in a known manner: including printing processes such as screen printing, offset printing, gravure printing, coater printing, tampon (tympan) printing, and transfer printing; and coating processes such as brush coating, spray coating, electrostatic coating, electrodeposition, flow coating, roller coating, and immersion coating. Otherwise, the layers may be formed into sheets by extrusion molding or other molding process, and stuck together, or the thermochromic layer and the coating layer may be formed integrally by multifilm co-extrusion. The base material for the thermochromic layer may be any material on which the thermochromic layer can be formed. The examples thereof include sheets, films, paper sheets, synthetic paper sheets, knits, textiles, cloths, nonwoven, synthetic leather, plastics, glass, porcelain, metal, wood, stone, and the like. The laminate may be a molded article in a certain shape, and may have a rough surface, or may be in a fiber form.

The aforementioned thermochromic layer 2 may also contain a non-thermochromic pigment in an appropriate amount to give a variety of color change. Letters or drawings may be placed underneath the thermochromic layer to hide the images by color change.

The film formation material includes: ionomer resins, isobutylene-maleic anhydride copolymer resins, acrylonitrile-acrylic styrene copolymer resins, acrylonitrile-styrene copolymer resins, acrylonitrile-butadiene-styrene copolymer resins, acrylonitrile-chlorinated polyethylene-styrene copolymer resins, ethylene-vinyl chloride copolymer resins, ethylene-vinyl acetate copolymer resins, ethylene-vinyl acetate-vinyl chloride graft copolymer resins, vinylidene chloride resins, vinyl chloride resins, chlorinated vinyl chloride resins, vinyl chloride-vinylidene chloride copolymer resins, chlorinated polyethylene resins, chlorinated polypropylene resins, polyamide resins, high density polyethylene resins, medium density polyethylene resins, linear low density polyethylene resins, polyethylene terephthalate resins, polybutylene terephthalate resins, polycarbonate resins, polystyrene resins, high-impact polystyrene resins, polypropylene resins, polymethylstyrene resins, polyacrylate ester resins, polymethyl methacrylate resins, epoxyacrylate resins, alkylphenol resins, rosin-modified phenol resins, rosin-modified alkyd resins, phenol-resin-modified alkyd resins, epoxy resin-modified alkyd resins, styrene-modified alkyd resins, acryl-modified alkyd resins, aminoalkyd resins, vinyl chloride-vinyl acetate resins, styrene-butadiene resins, epoxy resins, unsaturated polyester resins, polyurethane resins, vinyl acetate type emulsion resins, styrene-butadiene type emulsion resins, acrylate ester type emulsion resins, water-soluble alkyd resins, water-soluble melamine resins, water-soluble urea resins, water-soluble phenol resins, water-soluble epoxy resins, water-soluble polybutadiene resins, cellulose acetate, cellulose nitrate, ethylcellulose, and the like.

Of the above film formation materials, suitable ones for formation of the coating layer include alkylphenol resins, rosin-modified phenol resins, rosin-modified alkyd resins, styrene-modified alkyd resins, acryl-modified alkyd resins, aminoalkyd resins, vinyl chloride-vinyl acetate resins, styrene-butadiene resins, epoxy resins, acrylate ester resins, unsaturated polyester resins, polyurethane resins, vinyl acetate type emulsion resins, styrene-butadiene type emulsion resins, acrylate ester type emulsion resins, water-soluble alkyd resins, water-soluble melamine resins, water-soluble urea resins, water-soluble phenol resins, water-soluble epoxy resins, water-soluble polybutadiene resins, cellulose derivatives, and the like. These resins are applied in a form of a solution or dispersion in water or an organic solvent.

For formation of the film or the sheet, suitable film formation material, out of the above film formation materials, include ionomer resins, isobutylene-maleic anhydride copolymer resins, acrylonitrile-acrylic styrene copolymer resins, acrylonitrile-styrene copolymer resins, acrylonitrile-butadiene-styrene copolymer resins, acrylonitrile-chlorinated polyethylene-styrene copolymer resins, ethylene-vinyl chloride copolymer resins, ethylene-vinyl acetate copolymer resins, ethylene-vinyl acetate-vinyl chloride graft copolymer resins, vinylidene chloride resins, vinyl chloride resins, chlorinated vinyl chloride resins, vinyl chloride-vinylidene chloride copolymer resins, chlorinated polyethylene resins, chlorinated polypropylene resins, polyamide resins, high density polyethylene resins, medium density polyethylene resins, linear low-density polyethylene resins, polyethylene terephthalate resins, polybutylene terephthalate resins, polycarbonate resins, polystyrene resins, high-impact polystyrene resins, polypropylene resins, polymethylstyrene resins, polyacrylate ester resins, polymethyl methacrylate resins, epoxy resins, epoxyacrylate resins, alkyd resins, polyurethane resins, and the like.

The laminate of the present invention may be formed on a base material, and may be a laminate of a film composed of a melt blend containing a light-intercepting pigment dispersed therein on a thermochromic film composed of a melt blend containing a thermochromic material dispersed therein.

The light-intercepting pigment layer of the present invention performs both functions of light absorption (or light reflection) and light transmittance. Thereby, at least a part of ultraviolet light or visible light which causes deterioration of the function of the thermochromic layer is reflected or absorbed, and visible light is transmitted through the layer in a suitable ratio not to prevent visible observation.

The functions of a system comprising a metallic luster pigment are explained below. This system intercepts near-ultraviolet light and visible blue light (having the shortest wavelength and the highest energy of the visible light) which greatly affect photolyric decomposition of a blue light-developing electron-donating organic compound of the thermochromic pigments. The metallic luster pigment itself also intercepts ultraviolet light, and reflects blue light selectively and allows yellow light to penetrate through the layer. In the case where the thermochromic pigment is blue, the electron-donating coloring organic compound absorbs yellow light and reflects blue light, whereby the reflected color is observed to be blue in combination with the blue light reflected by the metallic luster pigment. When the thermochromic pigment has turned colorless, the electron-donating coloring organic compound reflect all the visible light, and the yellow light transmitted through the metallic luster pigment layer is also reflected by the thermochromic pigment layer. Consequently, all the wave lengths of light are reflected, and the reflected light is observed to be colorless. Thereby, color changes between a blue color and non-color. This phenomenon cannot occur in a system of the prior art employing a color filter. In this system, a part of the visible light is intercepted, and yet the reflected light in a decolored state is made colorless, thereby improving light-fastness. The above system containing a metallic luster pigment enables color change from a gold color, a silver color, a metallic color, or the like owing to the rainbow effect caused by selective interference of the visible light, light transmission effect, and lightness of the thermochromic layer.

In the present invention, formation of a light-stabilizer-containing layer in addition to the light-intercepting pigment-containing layer formed on the thermochromic layer 2 improves the light-fastness remarkably in comparison with the system having a simple thermochromic layer.

Specifically, the coating layers of the constitutions below improve the light-fastness as shown in the light-fastness test results in Tables 2 to 8 in comparison with Comparative Examples: the coating layer including the coating layer of type (1) having a light stabilizer layer 4 laminated on or underneath the light-intercepting pigment layer 3 (FIGS. 1 and 2); the coating layer of type (2) having a combined layer 5 containing a light-intercepting pigment layer and a light stabilizer dispersed in the same film-forming material (FIG. 3); the coating layer of type (2-1) having a light stabilizer layer 4 laminated on the above combined layer 4 (FIG. 4); and the coating layer of type (2-2) having a light stabilizer layer 4 laminated underneath the above combined layer 4 (FIG. 5).

It was found that the coating layer of type (2) (FIG. 3) which contains both a light-intercepting pigment and a light absorber dispersed in one and the same layer greatly improves the light-fastness in comparison with the coating layer of type (1) (FIGS. 1 and 2) which has a light stabilizer layer 4 laminated on or underneath the light-intercepting pigment layer 3.

The thermochromic laminate of the present invention is described below specifically by reference to Examples and Comparative Examples with the results of light-fastness tests. As described below, the unit "parts" are based on weight.

(1) Composition and color-changing properties of thermochromic pigment:

Table 1 shows the compositions and the color-changing properties of the thermochromic pigments (A to F) applied to the thermochromic layer of Examples 1 to 43 and Comparative Examples 1 to 18.

The thermochromic pigment was a microcapsular pigment which was prepared by encapsulating, in a microcapsule, a homogeneous mixture of three components of an electron-donating coloring organic compound, an electron-accepting compound and an organic compound medium for controlling color-changing temperature by a known microcapsulation method. The thermochromic pigments for which the lower and higher color change temperatures are shown exhibit color memory thermochromism.

(2) Preparation of the laminates of Examples 1 to 10:

A thermochromic layer of about 40 μm thick was formed by mixing with agitation 10 parts of thermochromic pigment, 45 parts of 50% acrylic resin solution in xylene, 20 parts of xylene, and 20 parts of methyl isobutyl ketone, and applying the mixture on a white polyvinyl chloride sheet by spraying. On the thermochromic layer, a light-intercepting pigment layer of about 40 μm thick was formed by mixing with agitation one part of a light-intercepting pigment, 45 parts of 50% acrylic resin solution in xylene, 20 parts of xylene, and 20 parts of methyl isobutyl ketone, and applying the mixture by spraying. Further on the light-intercepting pigment layer, a light stabilizer layer of about 35 μm thick was prepared by agitating and mixing a predetermined amount (see Table 2) of a light stabilizer, 45 parts of 50% acrylic resin solution in xylene, 20 parts of xylene, and 20 parts of methyl isobutyl ketone, and applying the mixture by spraying.

(3) Preparation of laminates of Examples 11 to 29:

The thermochromic layer was prepared in the same manner as in the above Examples 1 to 10. On the thermochromic layer, a combined layer of about 35 μm thick was formed by agitating and mixing one part of the light-intercepting pigment layer, a predetermined amount of a light stabilizer (see Tables 3 and 4), 45 parts of 50% acrylic resin solution in xylene, 20 parts of xylene, and 20 parts of methyl isobutyl ketone, and applying the mixture by spraying.

(4) Preparation of laminates of Examples 30 to 51:

The thermochromic layer and the combined layer were prepared in the same manner as in the above item (3), and the light stabilizer layer was formed on or beneath the combined layer in the same manner as in formation of the light stabilizer layer of the above item (2).

(5) Preparation of laminates of Comparative Examples of 1 to 18:

The thermochromic layer, the light-intercepting layer, and the light stabilizer layer were formed in the same manner as in the above item (2).

(6) Light-fastness test:

A test sample before light irradiation was subjected to measurement of the optical densities for the lightness degrees at a colored state and at a decolored state by a color difference meter. The difference of the lightness degrees is taken as 100%. After light irradiation by a carbon arc fade meter for 0, 40, 80, 120, 160, and 200 hours respectively, the lightness was measured and the rate of decay of the optical density was calculated relative to the above 100% value.

(7) Conditions of Examples and Comparative Examples, and results of light-fastness test:

Tables 2 to 6 show the conditions and the results of light-fastness test of Examples, and Tables 7 and 8 show those of Comparative Examples.

In Tables, Iriodins (100, 205, 219, 225, and 235) are pearl-luster pigments produced by Merck Japan Co.; MEARLINs (hi-lite colors blue, hi-lite colors violet, hi-lite colors green, pearl white, and super white) are pearl-luster pigment produced by The Mearl Corporation (U.S.A.); Tinuvins (328, 384, 1130, and PS) are benzotriazole type UV absorbers produced by Ciba Geigy Co.; Irgastab 2002 is a singlet oxygen quencher produced by Ciba Geigy Co.; Seesorb 103 is a benzophenone type UV absorber produced by Shipro Kasei K. K.; and Antigen NBC is a singlet oxygen quencher produced by Sumitomo Chemical Co., Ltd.

The thermochromic laminate of the present invention has greatly improved light-fastness, and has a permanent color change function as shown in the above light-fastness test results owing to the effects of the combination of a light-intercepting pigment layer and a light absorber layer.

In particular, as shown in the above light-fastness test results, the laminate having, as a coating layer, a combined layer containing both a light-intercepting pigment and a light stabilizer dispersed and fixed in a film-forming material on the thermochromic layer has remarkably improved light-fastness in comparison with the laminate having a single layer containing a light-intercepting pigment or a light stabilizer dispersed in a film-forming material or in comparison with the laminate having the combination of the above separate single layers. Additional lamination of a light stabilizer layer on or underneath the above combined layer gives further improvement. This lamination of a light stabilizer layer as the uppermost layer gives appropriate gloss of the laminate which is practically useful.

The light-intercepting pigment layer of the present invention allows transmission of visible light appropriately not to prevent visual observation, so that the color change of the thermochromic layer is visualized effectively. In particular, the laminate employing a metallic luster pigment visualizes multi-color change of metallic luster owing to synergism of the rainbow effect caused by selective interference and transmission of visible light and reflection effect of visible light in the thermochromic layer.

Thus, the present invention provides a thermochromic laminate which is useful in a variety of application fields such as toys, ornaments, teaching materials, fiber materials, household goods, sporting goods, indoor and outdoor articles, clothes, printing articles, and so forth.

TABLE 1

Compositions and Color Changes of Thermochromic Pigments

| Thermochromic pigment | Electron-donating coloring organic compound | Electron-accepting organic compound | Organic compound medium (Color change controller) | Color change Colored ←→ Decolored Color change temperature |
|---|---|---|---|---|
| A | 3-Dibutylamino-6-methyl-7-anilinofluoran (2) | Bisphenol-A (6) | Lauryl laurate (50) | Black ←→ Colorless 8° C. 35° C. (Color memory thermochromism) |
| B | 3-Diethylamino-7,8-benzofluoran (3) | Octyl 4-hydroxy-benzoate (7) | Lauryl laurate (50) | Pink ←→ Colorless 8° C. 35° C. (Color memory thermochromism) |
| C | 3-(Diethylamino-2-ethoxyphenyl)-3-(1-ethyl-2-methylindol-3-yl)-4-azaphthalide (1.5) | Bis(4-hydroxyphenyl)-methane (6) | Cetyl alcohol (30) Lauryl stearate (20) | Blue ←→ Colorless 35° C. |
| D | 3-Diethylamino-6,8-dimethylfluoran (3.5) | Thiodiphenol (7) | Myristyl alcohol (25) n-Butyl stearate (25) | Orange ←→ Colorless 15° C. |
| E | 3,3-Bis(1-n-butyl-2-methylindol-3-yl)phthalide (2) | 2,2-Bis(chloromethyl)-3-chloro-1-propanol (10) | 3-Phenylpropyl stearate (50) | Pink ←→ Colorless 18° C. |
| F | 3-Diethylamino-7-dibenzylaminofluoran (2) | Bisphenol A (5) | 3,3,5-Trimethylhexyl stearate (50) | Green ←→ Colorless 8° C. |

The numerals in the parentheses show parts by weight.

TABLE 2

Conditions and Light-Fastness Test Results of Examples

| Example No. | Type of coating layer | Thermochromic pigment layer | Light-intercepting pigment | Light stabilizer | Visible color change Colored ←→ Decolored Color change temperature | Light-fastness test results (Fade Meter, hours) 0 | 40 | 80 | 120 | 160 | 200 |
|---|---|---|---|---|---|---|---|---|---|---|---|
| 1 | (1) | A | Iriodin ® 100 (4%-1 g) | Tinuvin 328 (10%-2.5 g) | Silver ←→ White 8° C. 35° C. | 100 | 100 | 94 | 89 | 73 | 64 |
| 2 | (1) | A | Iriodin ® 225 (4%-1 g) | Tinuvin 328 (10%-2.5 g) | Metallic blue ←→ White 8° C. 35° C. | 100 | 100 | 99 | 94 | 87 | 70 |
| 3 | (1) | A | Iriodin ® 225 (10%-2.5 g) | Tinuvin 328 (10%-2.5 g) | Metallic blue ←→ White 8° C. 35° C. | 100 | 100 | 95 | 90 | 88 | 80 |
| 4 | (1) | A | Iriodin ® 225 (15%-4 g) | Tinuvin 328 (10%-2.5 g) | Metallic blue ←→ White 8° C. 35° C. | 100 | 100 | 96 | 92 | 89 | 81 |
| 5 | (1) | B | Iriodin ® 219 (4%-1 g) | Tinuvin PS (20%-5.6 g) | Metallic pink ←→ White 8° C. 35° C. | 100 | 100 | 93 | 88 | 81 | 69 |
| 6 | (1) | C | MEARLIN ® Hi-lite colors blue (4%-1 g) | Tinuvin 328 (10%-2.5 g) | Metallic blue ←→ White 35° C. | 100 | 100 | 98 | 92 | 86 | 71 |
| 7 | (1) | C | MEARLIN ® Hi-lite colors violet (4%-1 g) | Tinuvin 328 (5%-1.2 g) Irgastab 2002 (5%-1.2 g) | Metallic purple ←→ White 35° C. | 100 | 100 | 98 | 93 | 88 | 70 |
| 8 | (1) | D | MEARLIN ® Pearl white (4%-1 g) | Tinuvin PS (20%-5.6 g) Seesorb 103 (5%-1.2 g) | Metallic orange ←→ white 15° C. | 100 | 100 | 92 | 87 | 80 | 70 |
| 9 | (1) | E | Iriodin ® 219 (4%-1 g) | Tinuvin PS (15%-4.0 g) Antage NBC (5%-1.2 g) | Metallic violet ←→ White 18° C. | 100 | 100 | 91 | 86 | 79 | 66 |
| 10 | (1) | F | MEARLIN ® Hi-lite colors green (4%-1 g) | Tinuvin 328 (10-2.5 g) | Metallic green ←→ White 8° C. | 100 | 100 | 90 | 84 | 76 | 65 |

The percentages in the parentheses are based on weight.

TABLE 3-1

Conditions and Light-Fastness Test Results of Example

| Example No. | Type of coating layer | Thermochromic pigment layer | Combined layer | |
|---|---|---|---|---|
| | | | Light-intercepting pigment | Light stabilizer |
| 11 | (2) | A | Iriodin ® 100 (4%-1 g) | Tinuvin 328 (10%-2.5 g) |
| 12 | (2) | A | Iriodin ® 205 (4%-1 g) | Tinuvin 328 (10%-2.5 g) |
| 13 | (2) | A | Iriodin ® 225 (4%-1 g) | Tinuvin 328 (10%-2.5 g) |
| 14 | (2) | A | Iriodin ® 235 (4%-1 g) | Tinuvin PS (20%-5.6 g) |
| 15 | (2) | A | Fine particulate transparent titanium oxide (4%-1 g) | Tinuvin 328 (10%-2.5 g) Irgastab 2002 (5%-1.2 g) |
| 16 | (2) | A | Fine particulate transparent iron oxide (4%-1 g) | Tinuvin PS (15%-4.0 g) Seesorb 103 (5%-1.2 g) |
| 17 | (2) | A | Fine particulate transparent cerium oxide (4%-1 g) | Tinuvin 328 (10%-2.5 g) |

| Example No. | Visible color change Colored ←→ Decolored Color change temperature | Light-fastness test results (Fade meter, hours) | | | | | |
|---|---|---|---|---|---|---|---|
| | | 0 | 40 | 80 | 120 | 160 | 200 |
| 11 | Silver ←→ White  8° C.  35° C. | 100 | 100 | 95 | 90 | 81 | 74 |
| 12 | Gold ←→ White  8° C.  35° C. | 100 | 100 | 92 | 88 | 79 | 69 |
| 13 | Metallic blue ←→ White  8° C.  35° C. | 100 | 100 | 99 | 94 | 90 | 85 |
| 14 | Metallic green ←→ White  8° C.  35° C. | 100 | 100 | 93 | 87 | 78 | 70 |
| 15 | Black ←→ Colorless  8° C.  35° C. | 100 | 98 | 89 | 81 | 72 | 60 |
| 16 | Black ←→ Pale yellow  8° C.  35° C. | 100 | 96 | 88 | 80 | 70 | 61 |
| 17 | Black ←→ Pale yellow  8° C.  35° C. | 100 | 95 | 87 | 80 | 70 | 60 |

The percentages in the parentheses are based on weight.

TABLE 3-2

Conditions and Light-Fastness Test Results of Examples

| Example No. | Type of coating layer | Thermochromic pigment layer | Combined layer | |
|---|---|---|---|---|
| | | | Light-intercepting pigment | Light stabilizer |
| 18 | (2) | B | Iriodin ® 100 (4%-1 g) | Tinuvin 384 (20%-5.6 g) |
| 19 | (2) | B | Iriodin ® 219 (4%-1 g) | Tinuvin 384 (25%-7.5 g) |
| 20 | (2) | C | MEARLIN ® Hi-lite colors blue (4%-1 g) | Tinuvin 328 (10%-2.5 g) |
| 21 | (2) | C | MEARLIN ® Hi-lite colors violet (4%-1 g) | Tinuvin 328 (10%-2.5 g) |
| 22 | (2) | D | MEARLIN ® Pearl White (4%-1 g) | Tinuvin 328 (10%-2.5 g) |
| 23 | (2) | D | Fine particulate transparent zinc oxide (4%-1 g) | Tinuvin 328 (10%-2.5 g) |

TABLE 3-2-continued

| | Conditions and Light-Fastness Test Results of Examples | | | | | | |
|---|---|---|---|---|---|---|---|
| Example No. | Visible color change Colored ←→ Decolored Color change temperature | Light-fastness test results (Fade meter, hours) | | | | | |
| | | 0 | 40 | 80 | 120 | 160 | 200 |
| 18 | Metallic pink ←→ White 8° C.    35° C. | 100 | 100 | 98 | 90 | 85 | 80 |
| 19 | Metallic pink ←→ White 8° C.    35° C. | 100 | 100 | 98 | 92 | 86 | 81 |
| 20 | Metallic blue ←→ White 35° C. | 100 | 100 | 98 | 94 | 89 | 80 |
| 21 | Metallic purple ←→ White 35° C. | 100 | 100 | 98 | 93 | 88 | 81 |
| 22 | Metallic orange ←→ White 15° C. | 100 | 100 | 97 | 93 | 90 | 83 |
| 23 | Orange ←→ White 15° C. | 100 | 100 | 94 | 88 | 80 | 71 |

The percentages in the parentheses are based on weight.

TABLE 4

| | | Conditions and Light-Fastness Test Results of Examples | | |
|---|---|---|---|---|
| Example No. | Type of coating layer | Thermochromic pigment layer | Combined layer | |
| | | | Light-intercepting pigment | Light stabilizer |
| 24 | (2) | E | Iriodin ® 215 (4%-1 g) | Tinuvin 328 (10%-2.5 g) |
| 25 | (2) | E | Iriodin ® 219 (4%-1 g) | Tinuvin 328 (10%-2.5 g) |
| 26 | (2) | E | Iriodin ® 219 (10%-2.5 g) | Tinuvin 328 (10%-2.5 g) |
| 27 | (2) | E | Iriodin ® 219 (15%-4 g) | Tinuvin 328 (10%-2.5 g) |
| 28 | (2) | F | MEARLIN ® Hi-lite colors green (4%-1 g) | Tinuvin 328 (10%-2.5 g) |
| 29 | (2) | F | MEARLIN ® Super white (4%-1 g) | Tinuvin 328 (10%-2.5 g) |

| Example No. | Visible color change Colored ←→ Decolored Color change temperature | Light-fastness test results (Fade meter, hours) | | | | | |
|---|---|---|---|---|---|---|---|
| | | 0 | 40 | 80 | 120 | 160 | 200 |
| 24 | Metallic violet ←→ White 18° C. | 100 | 100 | 93 | 88 | 80 | 70 |
| 25 | Metallic violet ←→ White 18° C. | 100 | 100 | 95 | 90 | 86 | 79 |
| 26 | Metallic violet ←→ White 18° C. | 100 | 100 | 96 | 94 | 88 | 80 |
| 27 | Metallic violet ←→ White 18° C. | 100 | 100 | 99 | 95 | 89 | 85 |
| 28 | Metallic green ←→ White 8° C. | 100 | 100 | 93 | 89 | 84 | 79 |
| 29 | Metallic green ←→ White 8° C. | 100 | 100 | 91 | 85 | 79 | 69 |

The percentages in the parentheses are based on weight.

TABLE 5-1

| | | Conditions and Light-Fastness Test Results of Examples | | | |
|---|---|---|---|---|---|
| Example No. | Type of coating layer | Thermochromic pigment layer | Combined layer | | Light stabilizer layer Light stabilizer |
| | | | Light-intercepting pigment | Light stabilizer | |
| 30 | (2-1) | A | Iriodin ® 100 (4%-1 g) | Tinuvin 328 (10%-2.5 g) | Tinuvin 328 (10%-2.5 g) |

TABLE 5-1-continued

Conditions and Light-Fastness Test Results of Examples

| | | | | | |
|---|---|---|---|---|---|
| 31 | (2-1) | A | Iriodin® 225 (4%-1 g) | Tinuvin 328 (10%-2.5 g) | TinuvinPS (15%-4.0 g) Seesorb 103 (10%-2.5 g) |
| 32 | (2-1) | B | Iriodin® 100 (4%-1 g) | Tinuvin 384 (20%-5.6 g) | Tinuvin 384 (20%-5.6 g) |
| 33 | (2-1) | B | Iriodin® 219 (4%-1 g) | Tinuvin 328 (10%-2.5 g) | Tinuvin 328 (10%-2.5 g) |
| 34 | (2-1) | B | Iriodin® 219 (10%-2.5 g) | Tinuvin 328 (10%-2.5 g) | Tinuvin 328 (10%-2.5 g) |
| 35 | (2-1) | B | Iriodin® 219 (15%-3.4 g) | Tinuvin 328 (10%-2.5 g) | Tinuvin 328 (10%-2.5 g) |

| Example No. | Visible color change Colored ←→ Decolored Color change temperature | Light-fastness test results (Fade meter, hours) | | | | | |
|---|---|---|---|---|---|---|---|
| | | 0 | 40 | 80 | 120 | 160 | 200 |
| 30 | Silver ←→ White 8° C.    35° C. | 100 | 100 | 100 | 97 | 90 | 87 |
| 31 | Metallic blue ←→ White 8° C.    35° C. | 100 | 100 | 100 | 98 | 91 | 88 |
| 32 | Metallic pink ←→ White 8° C.    35° C. | 100 | 100 | 100 | 98 | 90 | 87 |
| 33 | Metallic pink ←→ White 8° C.    35° C. | 100 | 100 | 100 | 98 | 91 | 88 |
| 34 | Metallic pink ←→ White 8° C.    35° C. | 100 | 100 | 100 | 98 | 95 | 89 |
| 35 | Metallic pink ←→ White 8° C.    35° C. | 100 | 100 | 100 | 100 | 98 | 90 |

The percentages in the parentheses are based on weight.

TABLE 5-2

Conditions and Light-Fastness Test Results of Examples

| Example No. | Type of coating layer | Thermochromic pigment layer | Combined layer | | Light stabilizer layer Light stabilizer |
|---|---|---|---|---|---|
| | | | Light-intercepting pigment | Light stabilizer | |
| 36 | (2-1) | C | MEARLIN® Hi-lite colors blue (4%-1 g) | Tinuvin 328 (10%-2.5 g) | Tinuvin 328 (10%-2.5 g) |
| 37 | (2-1) | C | MEARLIN® Hi-lite colors violet (4%-1 g) | Tinuvin 328 (5%-1.2 g) Seesorb 103 (5%-1.2 g) | Tinuvin 384 (20%-5.6 g) |
| 38 | (2-1) | D | MEARLIN® Pearl white (4%-1 g) | Tinuvin PS (20%-5.6 g) | Tinuvin PS (20%-5.6 g) |
| 39 | (2-1) | D | Iriodin® 215 (4%-1 g) | Tinuvin 1130 (35%-12 g) | Tinuvin 1130 (35%-12 g) |
| 40 | (2-1) | E | Iriodin® 215 (4%-1 g) | Tinuvin 328 (10%-2.5 g) | Tinuvin 328 (10%-2.5 g) |
| 41 | (2-1) | E | Iriodin® 219 (4%-1 g) | Tinuvin 328 (10%-2.5 g) | Tinuvin PS (20%-5.6 g) |

| Example No. | Visible color change Colored ←→ Decolored Color change temperature | Light-fastness test results (Fade meter, hours) | | | | | |
|---|---|---|---|---|---|---|---|
| | | 0 | 40 | 80 | 120 | 160 | 200 |
| 36 | Metallic blue ←→ White 8° C.    35° C. | 100 | 100 | 100 | 98 | 90 | 87 |
| 37 | Metallic purple ←→ White 35° C. | 100 | 100 | 100 | 98 | 91 | 89 |
| 38 | Metallic orange ←→ White 15° C. | 100 | 100 | 100 | 98 | 92 | 90 |
| 39 | Metallic orange ←→ White 18° C. | 100 | 100 | 100 | 98 | 91 | 88 |
| 40 | Metallic violet ←→ White 18° C. | 100 | 100 | 100 | 97 | 90 | 87 |

TABLE 5-2-continued

Conditions and Light-Fastness Test Results of Examples

| | | | | | | | |
|---|---|---|---|---|---|---|---|
| 41 | Metallic violet ←→ White 18° C. | 100 | 100 | 100 | 97 | 90 | 87 |

The percentages in the parentheses are based on weight.

TABLE 6-1

Conditions and Light-Fastness Test Results of Examples

| Example No. | Type of coating layer | Thermochromic pigment layer | Combined layer Light-intercepting pigment | Light stabilizer | Light stabilizer layer Light stabilizer |
|---|---|---|---|---|---|
| 42 | (2-1) | F | MEARLIN ® Hi-lite colors green (4%-1 g) | Tinuvin 328 (10%-2.5 g) | Tinuvin 328 (10%-2.5 g) |
| 43 | (2-1) | F | MEARLIN ® Super white (4%-1 g) | Tinuvin 328 (10%-2.5 g) | Tinuvin 328 (10%-2.5 g) |
| 44 | (2-1) | A | Iriodin ® 225 (4%-1 g) | Tinuvin 328 (10%-2.5 g) | Tinuvin PS (15%-4.0 g) Seesorb 103 (5%-1.2 g) |
| 45 | (2-2) | B | Iriodin ® 219 (4%-1 g) | Tinuvin 328 (10%-2.5 g) | Tinuvin 328 (10%-2.5 g) |
| 46 | (2-2) | C | MEARLIN ® Hi-lite colors blue (4%-1 g) | Tinuvin 328 (10%-2.5 g) | Tinuvin 328 (10%-2.5 g) |

| Example No. | Visible color change Colored ←→ Decolored Color change temperature | Light-fastness test results (Fade meter, hours) | | | | | |
|---|---|---|---|---|---|---|---|
| | | 0 | 40 | 80 | 120 | 160 | 200 |
| 42 | Metallic green ←→ White 8° C. | 100 | 100 | 100 | 97 | 90 | 88 |
| 43 | Metallic green ←→ White 8° C. | 100 | 100 | 100 | 97 | 89 | 86 |
| 44 | Metallic blue ←→ White 8° C.    35° C. | 100 | 100 | 100 | 97 | 90 | 86 |
| 45 | Metallic pink ←→ White 8° C.    35° C. | 100 | 100 | 100 | 97 | 90 | 87 |
| 46 | Metallic blue ←→ White 35° C. | 100 | 100 | 100 | 98 | 90 | 86 |

The percentages in the parentheses are based on weight.

TABLE 6-2

Conditions and Light-Fastness Test Results of Examples

| Example No. | Type of coating layer | Thermochromic pigment layer | Combined layer Light-intercepting pigment | Light stabilizer | Light stabilizer layer Light stabilizer |
|---|---|---|---|---|---|
| 47 | (2-2) | D | Iriodin ® 215 (4%-1 g) | Tinuvin 1130 (35%-12 g) | Tinuvin 1130 (35%-12 g) |
| 48 | (2-2) | E | Iriodin ® 219 (4%-1 g) | Tinuvin 328 (20%-5.6 g) | Tinuvin PS (20%-5.6 g) |
| 49 | (2-2) | E | Iriodin ® 219 (10%-2.5 g) | Tinuvin 328 (10%-2.5 g) | Tinuvin PS (20%-5.6 g) |
| 50 | (2-2) | E | Iriodin ® 219 (15%-4.0 g) | Tinuvin 328 (10%-2.5 g) | Tinuvin PS (20%-5.6 g) |
| 51 | (2-2) | F | MEARLIN ® Hi-lite colors green (4%-1 g) | Tinuvin 328 (10%-2.5 g) | Tinuvin 328 (10%-2.5 g) |

TABLE 6-2-continued

Conditions and Light-Fastness Test Results of Examples

| Example No. | Visible color change Colored ←→ Decolored Color change temperature | \multicolumn{6}{c}{Light-fastness test results (Fade meter, hours)} | | | | | |
|---|---|---|---|---|---|---|---|
| | | 0 | 40 | 80 | 120 | 160 | 200 |
| 47 | Metallic orange ←→ White 15° C. | 100 | 100 | 99 | 97 | 91 | 88 |
| 48 | Metallic violet ←→ White 18° C. | 100 | 100 | 100 | 97 | 89 | 86 |
| 49 | Metallic violet ←→ White 18° C. | 100 | 100 | 100 | 98 | 92 | 89 |
| 50 | Metallic violet ←→ White 18° C. | 100 | 100 | 100 | 98 | 95 | 94 |
| 51 | Metallic green ←→ White 8° C. | 100 | 100 | 99 | 96 | 90 | 87 |

The percentages in the parentheses are based on weight.

TABLE 7

Conditons and Light-Fastness Test Results of Comparative Examples

| Comparative Example No. | Thermochromic pigment layer | Light-intercepting layer | Light stabilizer | Visible color change Colored ←→ Decolored Color change temperature | \multicolumn{6}{c}{Light-fastness test results (Fade meter, hours)} | | | | | |
|---|---|---|---|---|---|---|---|---|---|---|
| | | | | | 0 | 40 | 80 | 120 | 160 | 200 |
| 1 | A | — | — | Black ←→ White 8° C. 35° C. | 100 | 35 | 28 | 20 | 16 | 12 |
| 2 | B | — | — | Pink ←→ Colorless 8° C. 35° C. | 100 | 58 | 43 | 30 | 22 | 18 |
| 3 | C | — | — | Blue ←→ Colorless 35° C. | 100 | 47 | 38 | 30 | 24 | 17 |
| 4 | D | — | — | Orange ←→ Colorless 15° C. | 100 | 61 | 51 | 39 | 30 | 21 |
| 5 | E | — | — | Reddish purple ←→ colorless 18° C. | 100 | 52 | 43 | 35 | 23 | 18 |
| 6 | F | — | — | Green ←→ Colorless 8° C. | 100 | 56 | 40 | 31 | 23 | 17 |
| 7 | A | Iriodin ® 100 (4%-1 g) | — | Silver ←→ White 8° C. 35° C. | 100 | 100 | 88 | 75 | 62 | 50 |
| 8 | B | Iriodin ® 100 (4%-1 g) | — | Metallic pink ←→ White 8° C. 35° C. | 100 | 100 | 85 | 77 | 63 | 51 |
| 9 | C | MEARLIN ® Hi-lite colors blue (4%-1 g) | — | Metallic blue ←→ White 35° C. | 100 | 100 | 94 | 78 | 69 | 58 |
| 10 | D | MEARLIN ® Pearl white (4%-1 g) | — | Metallic orange ←→ White 15° C. | 100 | 100 | 84 | 75 | 63 | 52 |

The percentages in the parentheses are based on weight.

TABLE 8

Conditons and Light-Fastness Test Results of Comparative Examples

| Comparative Example No. | Thermochromic pigment layer | Light-intercepting layer | Light stabilizer | Visible color change Colored ←→ Decolored Color change temperature | \multicolumn{6}{c}{Light-fastness test results (Fade meter, hours)} | | | | | |
|---|---|---|---|---|---|---|---|---|---|---|
| | | | | | 0 | 40 | 80 | 120 | 160 | 200 |
| 11 | A | Iriodin ® 215 (4%-1 g) | — | Metallic violet ←→ White 18° C. | 100 | 95 | 85 | 73 | 60 | 51 |
| 12 | B | MEARLIN ® Super white (4%-1 g) | — | Metallic green ←→ White 8° C. | 100 | 91 | 79 | 70 | 61 | 49 |
| 13 | A | — | Tinuvin 328 (10%-2.5 g) | Black ←→ Colorless 8° C. 35° C. | 100 | 96 | 86 | 73 | 60 | 48 |
| 14 | B | — | Tinuvin 384 | Pink ←→ Colorless | 100 | 97 | 84 | 75 | 60 | 50 |

TABLE 8-continued

Conditons and Light-Fastness Test Results of Comparative Examples

| Comparative Example No. | Thermochromic pigment layer | Light-intercepting layer | Light stabilizer | Visible color change Colored ←→ Decolored Color change temperature | Light-fastness test results (Fade meter, hours) | | | | | |
|---|---|---|---|---|---|---|---|---|---|---|
| | | | | | 0 | 40 | 80 | 120 | 160 | 200 |
| 15 | C | — | Tinuvin 328 (20%-5.6 g) (10%-2.5 g) | 8° C.    35° C. Blue ←→ Colorless 35° C. | 100 | 95 | 90 | 74 | 67 | 52 |
| 16 | D | — | Tinuvin 328 (10%-2.5 g) | Orange ←→ Colorless 15° C. | 100 | 98 | 84 | 74 | 61 | 51 |
| 17 | E | — | Tinuvin 328 (10%-2.5 g) | Reddish purple ←→ White 18° C. | 100 | 93 | 84 | 70 | 58 | 47 |
| 18 | F | — | Tinuvin 328 (10%-2.5 g) | Green ←→ Colorless 8° C. | 100 | 90 | 74 | 66 | 56 | 43 |

The percentages in the parentheses are based on weight.

What is claimed is:

1. A thermochromic laminate, comprising:

a thermochromic layer comprising from 0.5–40 wt. % of a homogeneous mixture comprising an electron-donating coloring organic compound, an electron-accepting organic compound and an organic compound for adjusting color change temperature fixed in a first film forming material; and a combined layer laminated on the thermochromic layer, the combined layer comprising from 0.1–40 wt. % of a light-intercepting pigment and from 1–40 wt. % of a light stabilizer, the light-intercepting pigment and the light stabilizer being from 1.5 –60 wt. % in total and, dispersed and fixed in a second film-forming material, the light-intercepting pigment being one or more pigments selected from metallic luster pigments, transparent titanium dioxide, transparent iron oxide, transparent cerium oxide, and transparent zinc oxide; and the light stabilizer being one or more chemicals selected from ultraviolet absorbers, antioxidants, singlet oxygen quenchers, superoxide anion quenchers, ozone quenchers, visible light absorbers, and infrared absorbers.

2. The thermochromic laminate according to claim 1, wherein the light-intercepting pigment is a metallic luster pigment composed of natural mica whose surface is covered with titanium oxide, and having a particle size of from 5 to 100 μm.

3. The thermochromic laminate according to claim 2, wherein the light stabilizer is selected from UV absorbers.

4. The thermochromic laminate according to claim 1, wherein the light stabilizer is a UV absorber.

5. The thermochromic laminate according to claim 1, wherein a mixture of an electron-donating coloring organic compound, an electron-accepting compound, and an organic compound medium is enclosed in microcapsules.

6. The thermochromic laminate according to claim 1, further comprising a light stabilizer layer laminated on said combined layer.

7. The thermochromic laminate according to claim 6, wherein the light stabilizer layer comprises a UV absorber.

8. The thermochromic laminate according to claim 1, further comprising a light stabilizer layer laminated underneath said combined layer.

9. The thermochromic laminate according to claim 8, wherein the light stabilizer layer comprises a UV absorber.

* * * * *